(12) United States Patent
Arul

(10) Patent No.: US 11,565,616 B2
(45) Date of Patent: Jan. 31, 2023

(54) CANOPY STRUCTURE FOR TRUCK BODY

(71) Applicant: Caterpillar Inc., Peoria, IL (US)

(72) Inventor: Samuel J. Arul, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 312 days.

(21) Appl. No.: 16/883,875

(22) Filed: May 26, 2020

(65) Prior Publication Data

US 2021/0370818 A1 Dec. 2, 2021

(51) Int. Cl.
*B60P 1/28* (2006.01)
*E02F 9/16* (2006.01)
*B60R 21/11* (2006.01)
*B60R 21/00* (2006.01)

(52) U.S. Cl.
CPC ............... *B60P 1/28* (2013.01); *B60R 21/11* (2013.01); *E02F 9/163* (2013.01); *B60R 2021/0081* (2013.01)

(58) Field of Classification Search
CPC ............. B60R 21/11; B60R 2021/0074; B60R 2021/0076; B60R 2021/0081; E02F 9/163; B60P 1/28; B60P 1/283; B60P 1/286
See application file for complete search history.

(56) References Cited

U.S. PATENT DOCUMENTS

| | | | |
|---|---|---|---|
| 6,322,133 B1 | 11/2001 | Yantek et al. | |
| 6,481,785 B1* | 11/2002 | Coleman | B60P 1/286 298/17 R |
| 6,520,590 B2* | 2/2003 | Feuereisen Azocar | B62D 33/02 298/7 |
| 6,592,172 B2 | 7/2003 | Fujan et al. | |
| 7,427,097 B2 | 9/2008 | Yoon | |
| 11,135,912 B2* | 10/2021 | Utsumi | B60K 13/04 |
| 2007/0046068 A1 | 3/2007 | D'Amico | |
| 2012/0086235 A1 | 4/2012 | Pinto | |
| 2013/0234468 A1 | 9/2013 | Hall | |
| 2021/0188147 A1* | 6/2021 | De Jager | B60P 1/286 |
| 2022/0032832 A1* | 2/2022 | Arul | B60P 1/28 |

FOREIGN PATENT DOCUMENTS

| | | |
|---|---|---|
| CN | 203186280 | 9/2013 |
| CN | 204936910 | 1/2016 |
| CN | 110001569 | 7/2019 |
| EP | 3 233 712 B1 | 4/2019 |
| JP | 5751429 | 7/2015 |
| WO | 2013091007 | 6/2013 |
| WO | WO 2015/010156 A1 | 1/2015 |

* cited by examiner

Primary Examiner — Laura Freedman
(74) Attorney, Agent, or Firm — Xsensus LLC

(57) ABSTRACT

A canopy of a dump body for a truck comprises a deck having a length and a width greater in dimension that the length defined by a front edge, a rear edge opposite the front edge, a first side edge, and a second side edge opposite the first side edge. The deck can define an upper surface and a lower surface opposite the upper surface. In a front view the deck can define a concave shape, with a center portion and stepped portions between the center portion and the first and second side edges.

20 Claims, 6 Drawing Sheets

CANOPY STRUCTURE FOR TRUCK BODY

TECHNICAL FIELD

The present disclosure relates to haul trucks, and more particularly to canopy structures of dump bodies of haul trucks, and systems, arrangements, assemblies, and methods thereof.

BACKGROUND

Canopies for haul trucks can be located at a top interface between a front wall and sidewalls of the truck body. Generally, the canopy can provide protection from falling debris (e.g., rocks) for the front portion of the truck, such as the operator cabin, an underlying walkway, or other truck components (e.g., front tires). However, providing a canopy can add weight to the truck, particularly if longitudinal and/or transverse support structures are added.

Additionally, canopies may not be designed to carry a large amount of materials (e.g., hauling material). However, during loading a relatively large amount of materials may be unintentionally provided on the canopy (i.e., canopy loading), which can adversely affect the center of gravity of the truck and load distribution of the tires. This can lead to excessive tire heat and wear.

On the other hand, in cases where a canopy is designed substantially to prevent no material to remain on the canopy, material inadvertently placed on the canopy during loading may slide off the canopy and fall onto the roadway. The resulting material on the roadway may pose a hazard for other vehicles traveling on the roadway and increase maintenance requirements for the roadway.

WO 2015/010156 ("the '156 publication") describes a dump body with a canopy having a top portion and a plurality of inclined faces. According to the '156 publication, the shape of upper surface of the canopy is such that payload accidentally dropped on the upper surface will either slide back into the main body or will slide off the side inclined faces and onto the ground. The '156 publication also describes that the top portion is relatively small and is unlikely to be able to support an undesirable amount of payload.

SUMMARY OF THE DISCLOSURE

In one aspect, a canopy of a dump body for a truck is disclosed. The canopy can comprise a deck having a length and a width greater in dimension that the length defined by a front edge, a rear edge opposite the front edge, a first side edge, and a second side edge opposite the first side edge. The deck can define an upper surface and a lower surface opposite the upper surface, and in a front sectional view the body can define a down-facing concave shape, with a center portion and stepped portions between the center portion and the first and second side edges.

In another aspect, a canopy system for a dump body is disclosed. The canopy system can comprise a deck having a length and a width greater in dimension that the length defined by a front edge, a rear edge opposite the front edge, a first side edge, and a second side edge opposite the first side edge. The deck can define an upper surface and a lower surface opposite the upper surface, in a front plan view the deck can define a down-facing concave shape, with a flat center portion and stepped portions between the flat center portion and the first and second side edges, and the deck can be without any transversely extending support structures on the upper surface and/or on the lower surface.

And in yet another aspect, an off-highway rear haul truck is disclosed. The off-highway rear haul truck can comprise a frame; and a dump body configured to be operatively coupled to the frame. The dump body can include a front wall, and a self-supporting corrugated canopy having a front edge, a rear edge opposite the front edge, a first side edge, and a second side edge opposite the first side edge, the self-supporting corrugated canopy extending from a top portion of the front wall. The self-supporting corrugated canopy can have a down-facing concave shape in a front sectional view, with a pair of upward-projecting peaks spaced from each other in a transverse direction by a single valley, a first plurality of steps between a first one of the peaks and the first side edge, and a second plurality of steps between a second one of the peaks and the second side edge. The peaks can be symmetrical and run parallel to each other from a front portion of the self-supporting corrugated canopy to a rear portion of the self-supporting corrugated canopy.

Other features and aspects of this disclosure will be apparent from the following description and the accompanying drawings.

DETAILED DESCRIPTION

Embodiments of the disclosed subject matter involve canopy structures of dump bodies of haul trucks, and systems, arrangements, assemblies, and methods thereof.

Figure 1:
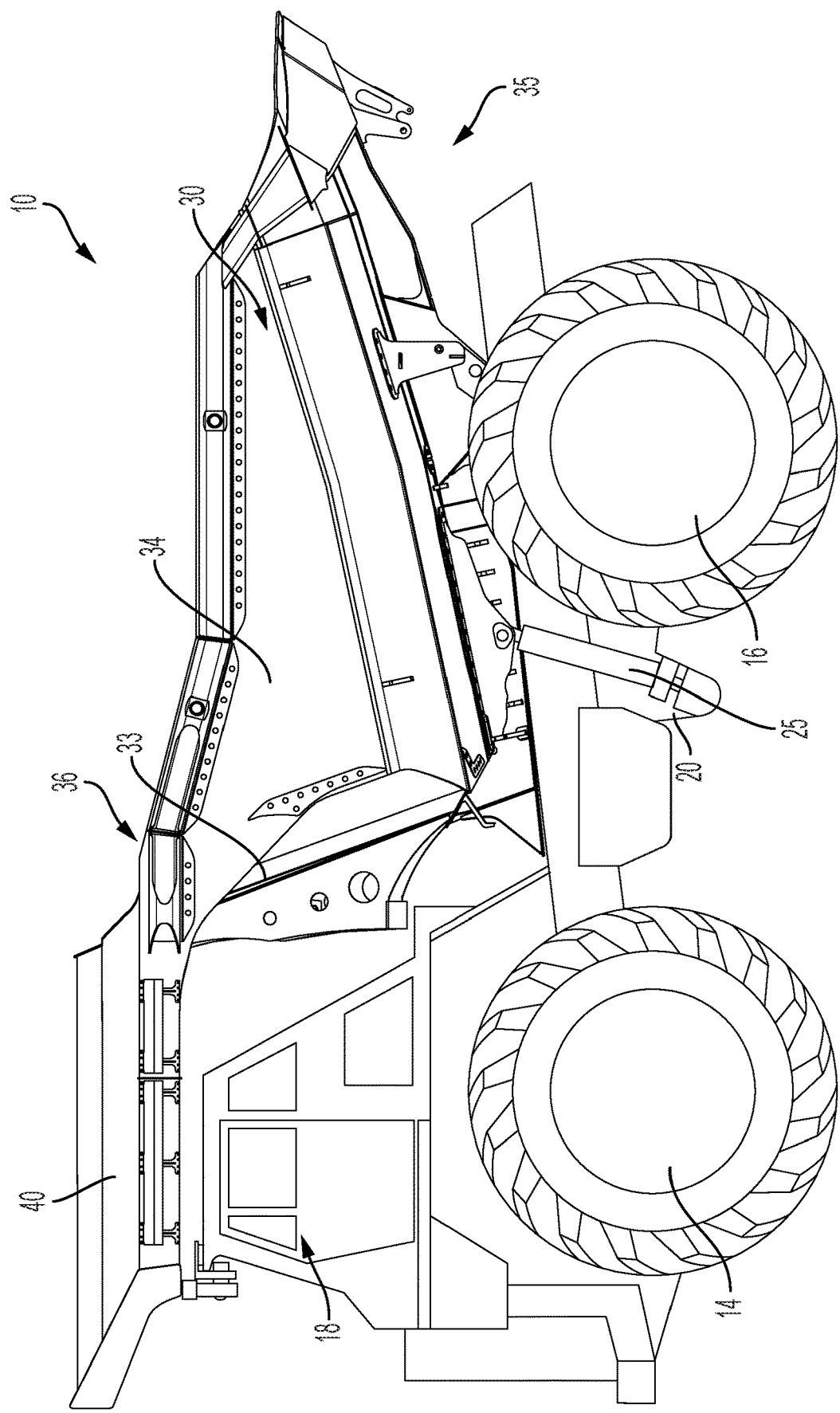
FIG. 1 is a side view of a truck according to embodiments of the disclosed subject matter.

Referring now to the drawings and with specific reference to FIG. 1, this figure illustrates an exemplary embodiment of a truck 10, according to one or more embodiments of the disclosure. Truck 10 may perform some type of operation associated with an industry such as mining, construction, or any other industry known in the art. For example, as shown in FIG. 1, truck 10 may be an earth moving machine, particularly, an off-highway rear haul truck 10.

Truck 10 may have a frame 20 supported by front wheels 14 and rear wheels 16 (including respective tires). The front and rear wheels 14, 16 may be connected to frame 20 by front suspension members and rear suspension systems, respectively (not expressly shown). Truck 10 may also include a bed or body 30 supported by the frame 20. Such bed or body 30 may be referred to herein as a dump body 30. The dump body 30 can be configured as a receptacle to receive hauling material.

A rear portion 35 of the dump body 30 can be pivotably coupled or attached to a portion (including portions) at a rear of the frame 20. Thus, the dump body 30 can be pivoted from a lowermost or rest position (i.e., not raised), such as shown in FIG. 1, to a raised position (e.g., fully raised). That is, the dump body 30 can be pivoted at the rear portion 35 of the frame 20 to raise or lower the portion of the dump body 30 in front of the pivot (and hence move the portion of the dump body 30 behind the pivot in the opposite direction). Such pivoting of the dump body 30 to raise a front portion 36 of the dump body 30 can be to dump content from within the dump body 30. Likewise, pivoting of the dump body 30 to lower the front portion 36 of the dump body 30 to the rest position can be to receive content in the dump body 30. The pivoting can be performed using a pair of hoist members 25 (which may include cylinders) operatively coupled to the frame 20 and the dump body 30.

Truck 10 may have an operator cabin 18 supported by the frame 20. Truck 10 may also be equipped with a steering mechanism and controls to move the truck 10 and controls to raise and lower dump body 30. The steering mechanism and the controls may be located within the operator cabin 18 of the truck 10.

The dump body 30 can also have a canopy 40. The canopy 40 can be fixedly coupled (e.g., welded) to a top portion of a front wall 33 of the dump body 30 and front edges of opposing side walls 34 of the dump body 30. Thus, the canopy 40 can extend forward or in a longitudinal direction of the dump body 30 from the top portion of the front wall 33 and the opposing side walls 34 of the dump body 30. The canopy 40 can extend so as to at least cover the cabin 18.

Truck 10 may have a prime mover (not expressly shown) supported by the frame 20. The prime mover may be configured to propel the front and rear wheels 14, 16 in the forward or rearward direction. The prime mover may be lengthwise aligned on the frame 20 along a travel direction of the truck 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Figure 2:
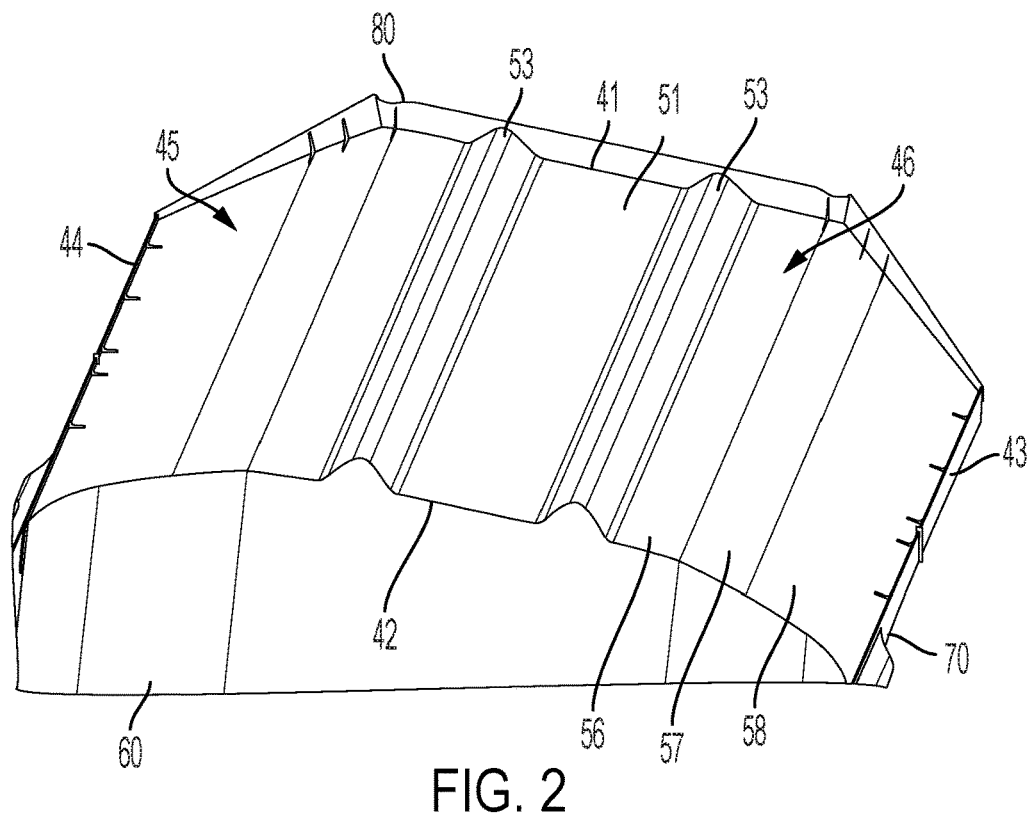
FIG. 2 is a top perspective view of a canopy according to embodiments of the disclosed subject matter.
Figure 3:
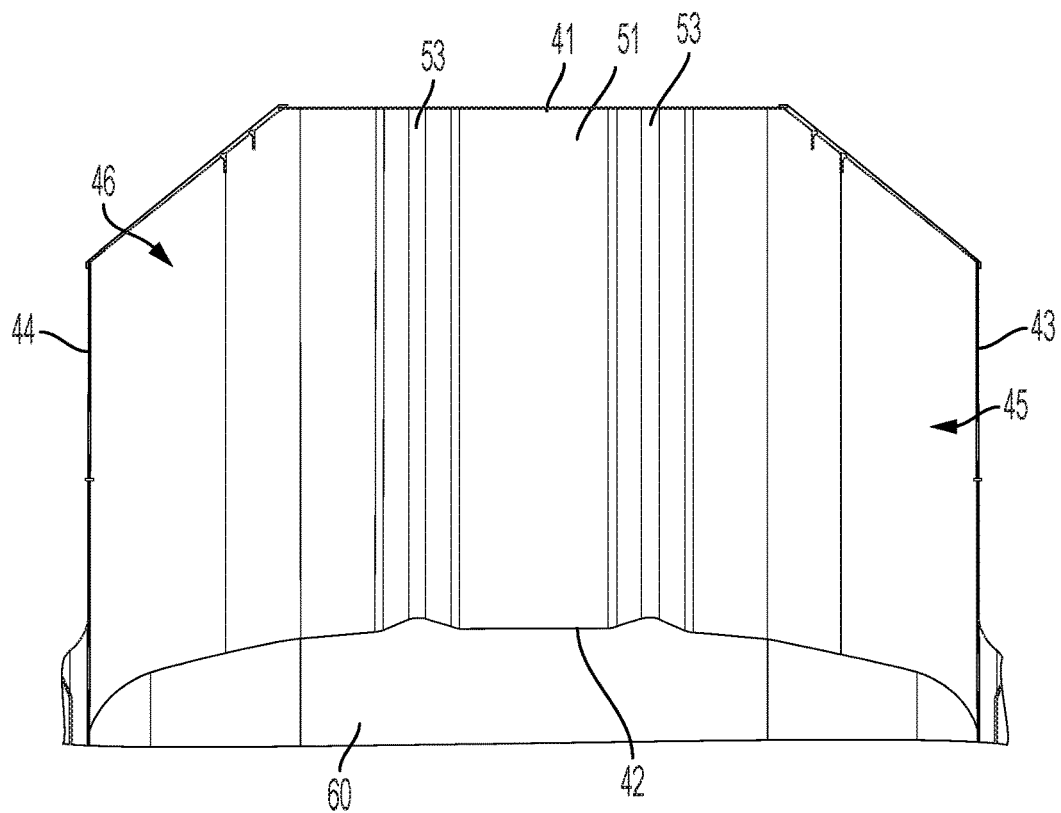
FIG. 3 is a top elevational view of the canopy of FIG. 2.
Figure 4:
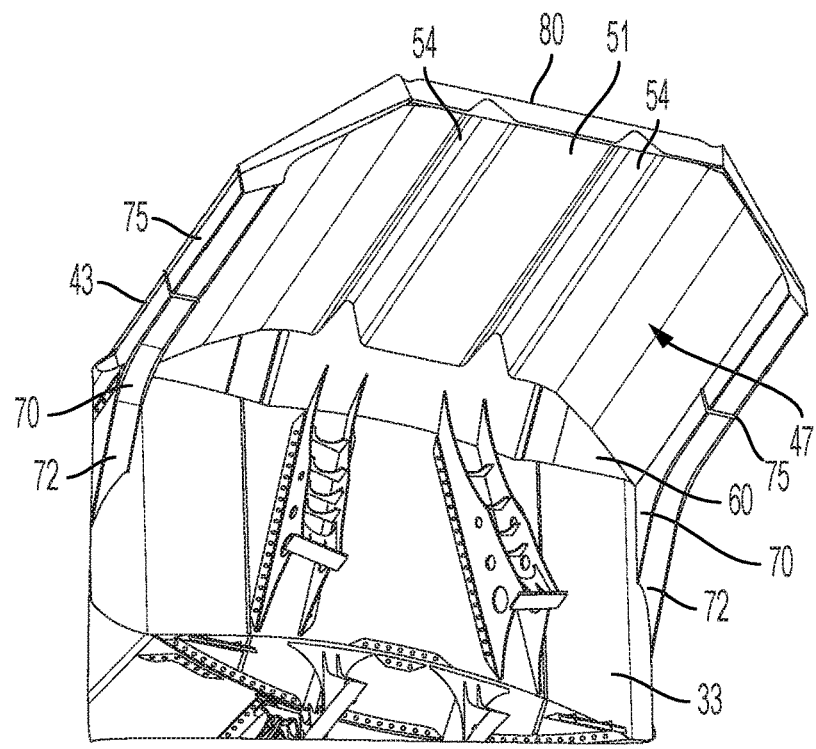
FIG. 4 is a bottom perspective view of a front portion of the body of the truck of FIG. 1.
Figure 5:
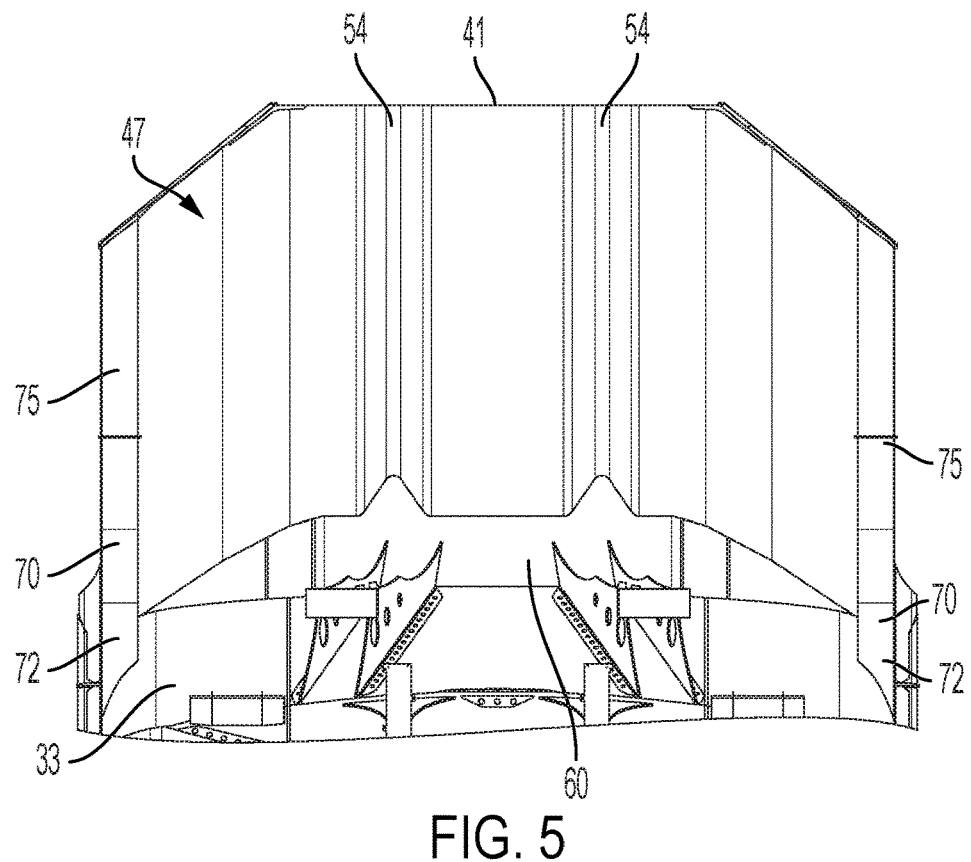
FIG. 5 is a bottom elevational view of the front portion of FIG. 4.

Turning to the other figures, FIG. 2 and FIG. 3 show top views of the canopy 40, aid FIG. 4 and FIG. 5 show bottom views of the canopy 40. The canopy 40 can define a front edge 41, a rear edge 42 opposite the front edge 41, a first side edge 43, and a second side edge 44 opposite the first side edge 43. A length of the canopy 40 (in a longitudinal direction of the dump body 30) can be less than a width of the canopy 40 (in a transverse direction of the dump body 30). Optionally, the front edge 41 of the canopy 40 can be chamfered. For instance, the corners of the front edge 41 can be chamfered, such as shown in FIG. 3 and FIG. 5.

The canopy 40 can include a deck 45 that defines an upper surface 46 and a lower surface 47 opposite the upper surface 46. Optionally, support structures can be provided to connect the canopy 40 to the front wall 33 and the front edges of the side walls 34 of the dump body 30. For instance, a transverse support structure 60 can be provided. As another example, opposing edge support structures 70 can be provided. Optionally, the transverse support structure 60 and/or the edge support structures 70 can be considered part of the canopy 40.

The transverse support structure 60 can be provided between the rear edge 42 of the canopy 40 and the front wall 33 of the dump body 30. The transverse support structure 60 can also be provided between the rear edge 42 of the canopy 40 and the front edges of the side walls 34. The transverse support structure 60 can be fixedly coupled (e.g., welded) to the front wall 33 of the dump body 30 and optionally the front edges of the side walls 34, and hence can connect the rear edge 42 of the canopy 40 to the front wall 33 and optionally the side walls 34 of the dump body 30.

Figure 8:
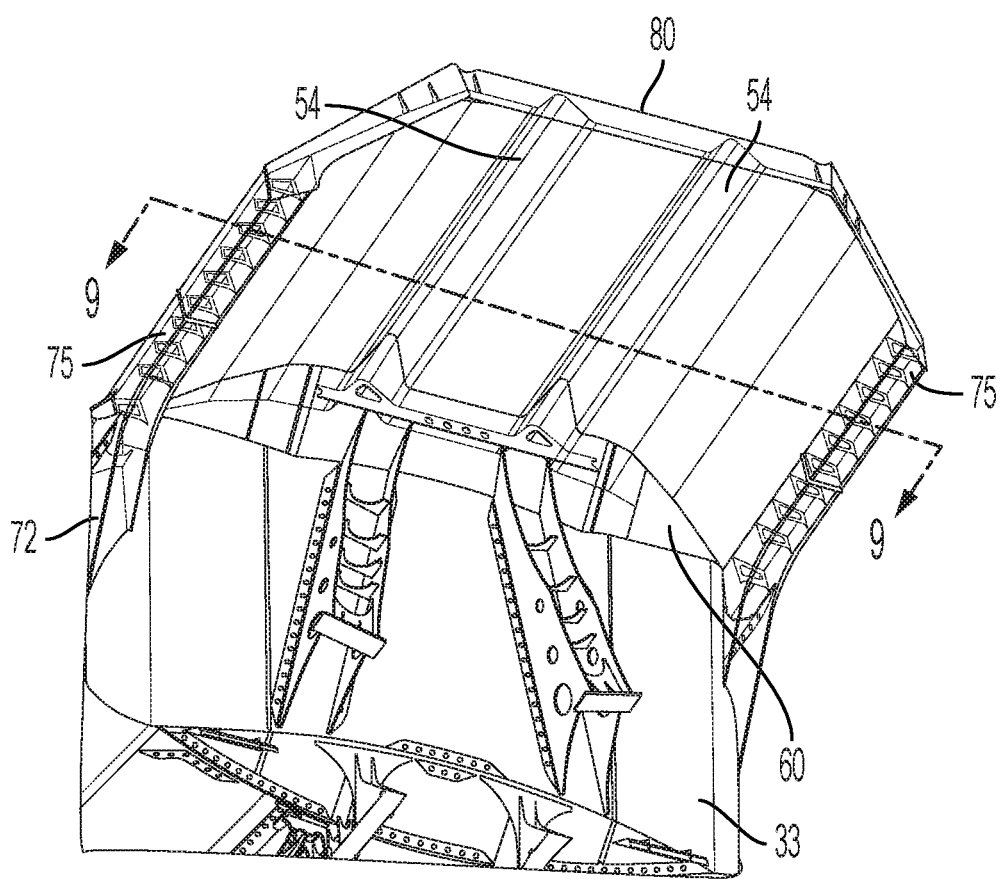
FIG. 8 is a bottom perspective transparent view of the front portion of FIG. 4.

The edge support structures 70 can run from at least a portion of the front edges of the side walls 34 and the side edges of the front wall 33 of the dump body 30 to top corners where the front wall 33 and side walls 34 meet, and from here project or extend in a longitudinal direction of the dump body 30, away from the front wall 33 and side walls 34. For each edge support structure 70, the portion thereof that runs along the aforementioned edges of the front wall 33 and the side wall 34 may be referred to as a leg 72, and the portion thereof that extends from the aforementioned edges may be referred to as an arm 75 of the edge support structure 70. As shown in FIG. 8, for instance, the arm 75 can be hollow, with a plurality of spaced gussets.

The edge support structures 70 can be fixedly coupled (e.g., welded) to the front edges of the front wall 33 and the side walls 34. Additionally, the deck 45 of the canopy 40 can be fixedly coupled (e.g., welded) to the edge support structures 70. That is, the first side edge 43 and the second side edge 44 of the canopy 40 can be fixedly coupled (e.g., welded) to respective opposing edge support structures 70.

An upstanding plate or headboard 80 can be provided, and may, according to one or more embodiments, be considered part of the canopy 40. The upstanding headboard 80 can be provided at the front edge 41 of the canopy 40, and may extend from the first side edge 43 to the second side edge 44. The upstanding headboard 80 may extend horizontally or substantially horizontally from the upper surface 46 of the deck 45. According to one or more embodiments, the top edge of the upstanding headboard 80, for instance, at a transverse middle portion of the upstanding headboard 80, may form the uppermost portion of the canopy 40.

Figure 9:
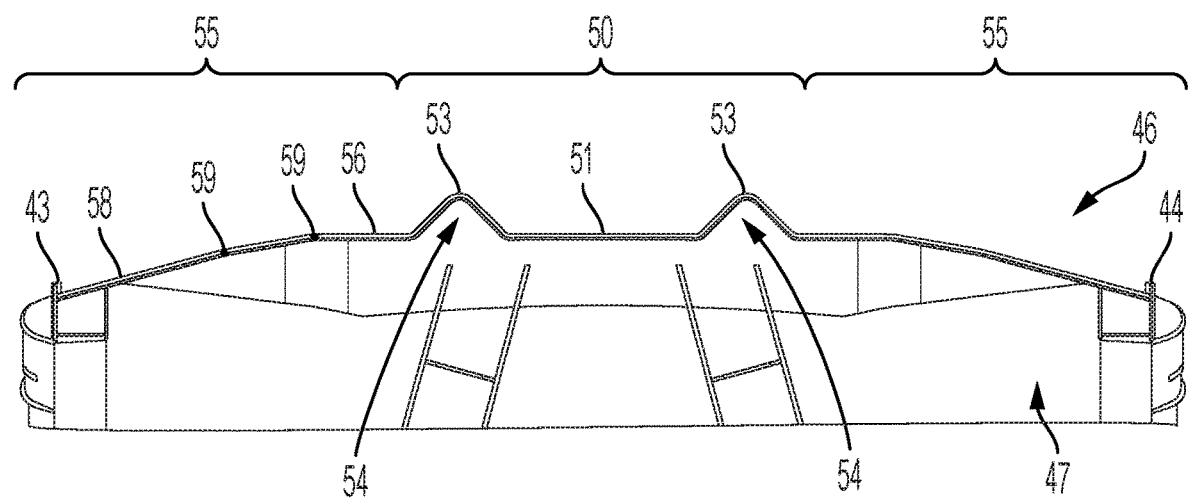
FIG. 9 is a sectional view along line 9-9 of FIG. 8.
Figure 10:
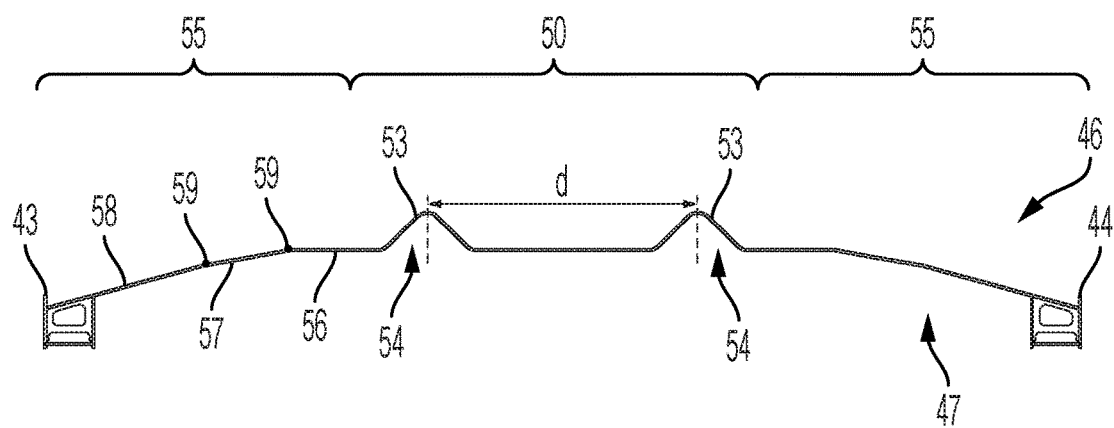
FIG. 10 is a sectional view of a deck of a canopy according to one or more embodiments of the disclosed subject matter.

The deck 45 of the canopy 40 can be concave in shape. More specifically, as shown in FIG. 4, FIG. 8, FIG. 9, and FIG. 10, the deck 45 of the canopy 40, at least when installed on the dump body 30, can have a down-facing concave shape. In this regard, as shown in FIG. 9 and FIG. 10, the deck 45 can have peripheral portions 55 and a center portion 50 between the peripheral portions 55, each running in the longitudinal direction of the dump body 30 (i.e., the length direction of the canopy 40).

The center portion 50 can include at least one flat portion 51, which may be flat on the upper surface 46 of the deck 45. Optionally, the at least one flat portion 51 may be flat on the lower surface 47 of the deck 45. The flat portion 51 can be flat along the entire length-wise direction of the deck 45. That is, the flat portion 51 can be entirely flat along the entire length-wise direction of the deck 45 from a front edge of the deck 45 to a rear edge of the deck 45 (which may also be the rear edge 42 of the canopy 40).

The center portion 50 may also include one or more raised support structures 53. As an example, FIGS. 2-5 and 7-10 show two raised support structures 53. In the case of multiple raised support structures 53, adjacent raised support structures 53 can be separated from each other in a transverse direction of the canopy 40. According to one or more embodiments, the raised support structures 53 can be separated from each other by the flat portion 51.

The raised support structures 53 may be referred to as peaks or ridges. Hence, the flat portion 51 between two raised support structures 53 may be referred to as a valley. The raised support structures 53 may be formed by the deck 45, rather than being coupled or otherwise provided separate from the deck 45. According to one or more embodiments, the configuration of the raised support structures 53 individually or together (optionally with the flat portion 51) may be referred to as corrugated. As a non-limiting example, a distance d between the raised support structures 53, for instance, from respective bases or peaks, can be 2 meters. As another non-limiting example, the height of the raised support structures 53 can be 275 mm. As an example, the width of the raised support structures 53, at a base thereof, can be 720 mm.

In a front or rear sectional view, the raised support structures 53 may be triangular in shape, such as shown in FIG. 9 and FIG. 10, with linear sides. Optionally, the top vertex may be rounded. Moreover, the triangular shape can have an open base. That is, the raised support structure 53 can, on a lower surface 47 deck 45, form a channel 54. That is, a void may be provided in the underside volume of the raised support structure 53.

Figure 6:
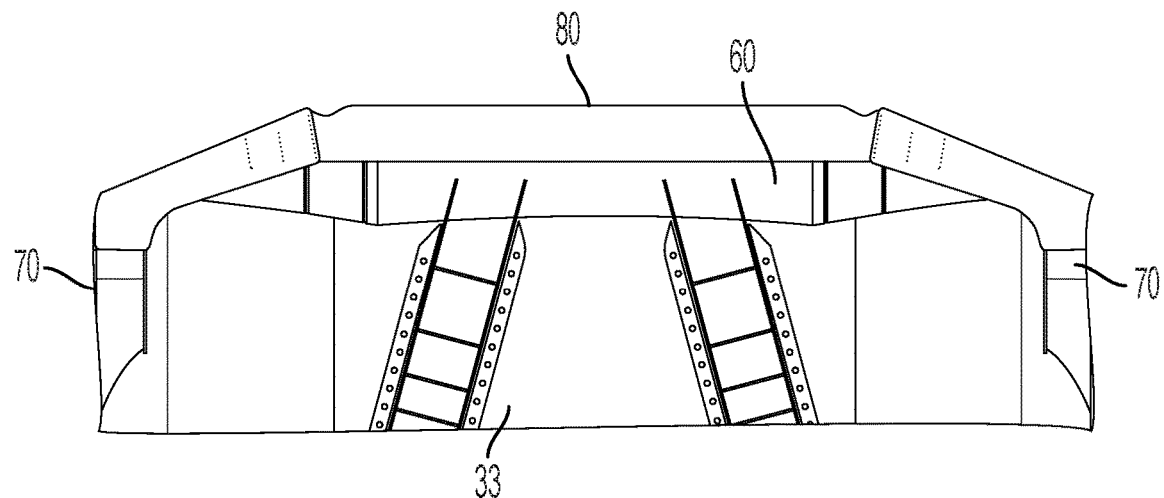
FIG. 6 is a front elevational view of a deck or floor of the canopy of FIG. 2.
Figure 7:
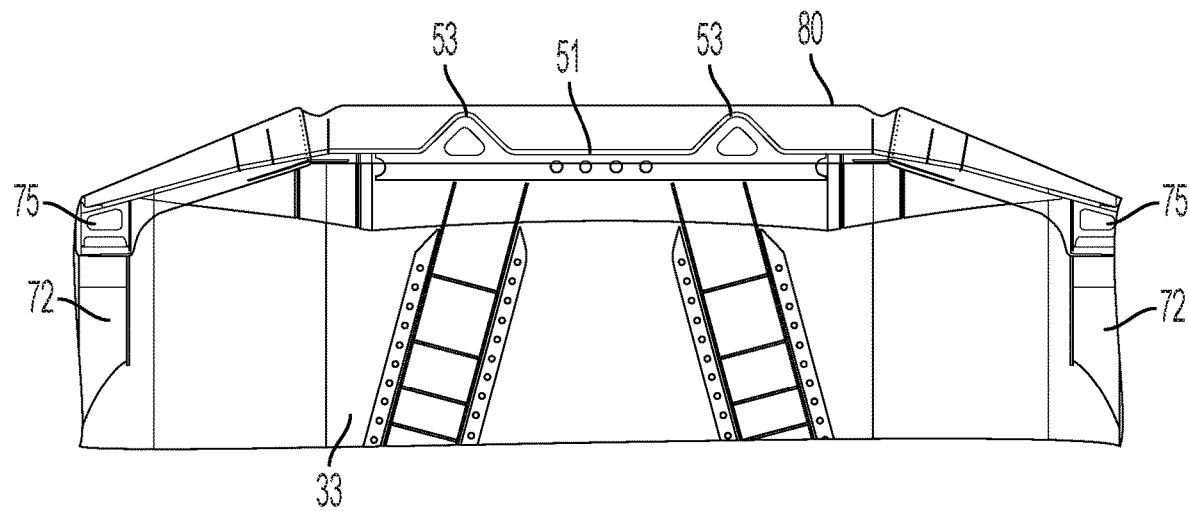
FIG. 7 is a front transparent view of the deck of FIG. 6.

According to one or more embodiments, the upstanding headboard 80 may be provided at an end (i.e., front end) of the raised support structures 53, for instance, to close off the channel 54, such as shown in FIG. 6 and FIG. 7 (transparent view). Embodiments of the disclosed subject matter are not limited to the specific geometry shown in FIG. 9 and FIG. 10, however. For instance, the top vertex may form a point, rather than being rounded. As another example, the sides may not be linear, and may be concave or convex, for instance. As yet another example, the shape can be asymmetrical, for instance, an irregular triangular shape or an isosceles trapezoid shape.

The raised support structures 53 can run in a length-wise or longitudinal direction of the canopy 40. For instance, in the case of multiple raised support structures 53, at least two of the raised support structures 53 can run in parallel with each other. Moreover, according to embodiments of the disclosed subject matter, the raised support structures 53 can extend from a front edge of the body 45 to a rear edge of the deck 45 (which may also be the rear edge 42 of the canopy 40). Optionally, the raised support structures 53 may be symmetrical in terms of positioning on the deck 45 and/or in terms of geometrical configuration relative to one or more other raised support structure 53.

Each peripheral portion 55 can extend from the center portion 50 to opposing side edges of the deck 45. According to one or more embodiments, the peripheral portions 55 can respectively extend from the center portion 50 to the first side edge 43 and the second side edge 44. Additionally, according to one or more embodiments, side edges of the peripheral portion 55 can be coupled (e.g., welded) to opposing edge support structures 70. In an overhead elevational or plan view of the canopy 40, a transverse dimension of the flat portion 51 can be less than a transverse dimension of the peripheral portion.

As noted above, the deck 45 can have a concave shape. Hence, the peripheral portions 55 can change elevation relative to the flat portion 51. According to one or more embodiments, no portion of the peripheral portions 55 may be above the center portion 50. Even more specifically, according to one or more embodiments, no portion of the peripheral portions 55 may be above the flat portion 51.

In that the deck 45 can be concave, each peripheral portion 55 can be curved or arched. Such curvature can be symmetrical about a longitudinal or length-wide center line of the canopy 40. According to one or more embodiments, each peripheral portion 55 can be stepped. Stepped, as used herein, can mean at least one delineated transition from the center portion 50 to the side edges of the deck 45. Put another way, each peripheral portion 55 can have one or more defined bends and breaks.

For instance, FIG. 2 shows each peripheral portion 55 having three stepped portions, stepped portion 56, stepped portion 57, and stepped portion 58. As shown in FIG. 9 and FIG. 10, for instance, each stepped portion can be defined according to a bend or break 59. Though the figures show three stepped portions 56, 57, 58, embodiments of the disclosed subject matter are not so limited. Moreover, some or all of the stepped portions 56, 57, 58 can be different in transverse length. For instance, stepped portion 56 can be shorter (in the transverse direction) than stepped portion 57, and stepped portion 57 can be shorter (in the transverse direction) than stepped portion 58, though embodiments of the disclosed subject matter are not so limited (e.g., stepped portion 57 and stepped portion 58 can be the same transverse length). As a more specific example, the transverse length of stepped portion 56 can be 640 mm, the transverse length of stepped portion 57 can be 650 mm, and the transverse length of stepped portion 58 can be 1200 mm. According to one or more embodiments, the transverse length of stepped portion 56 can be half of the transverse length of the center portion 51. In other words, in this example, the raised support structures 53 can be symmetrically located from centerline of the canopy 40 but also from breaks 59 that define edges of the stepped portion 56.

At the breaks 59, the peripheral portion 55 can change sloping characteristics. For instance, the angle of slope (e.g., angle of decline) can change or be different for each of the stepped portions 56, 57, 58. According to one or more embodiments, the angle of decline can increase from the stepped portion 56 to the stepped portion 57, and likewise from the stepped portion 57 to the stepped portion 58. Additionally or alternatively, the slope for the stepped portion 56 can be linear, whereas the slope for the stepped portion 57 can be non-linear (i.e., curved). Likewise, the stepped portion 58 may have a different slope characteristic as compared to the stepped portion 57. As an example, the stepped portion 56 may be at a zero angle (i.e., horizontal), stepped portion 57 may be ten degrees below horizontal, and stepped portion 58 may be fifteen degrees below horizontal. Such angles may be along an entirety of the particular stepped portion, or an average angle in the case of a non-linear shaped stepped portion. Optionally, at the first side edge 43 and the second side edge 44 of the canopy 40, upstanding portions can be provided by the deck 45, such as shown in FIG. 9 and FIG. 10.

INDUSTRIAL APPLICABILITY

As noted above, embodiments of the present disclosure relate to canopy structures of dump bodies of haul trucks, and systems, arrangements, assemblies, and methods thereof.

Embodiments of the disclosed subject matter can implement a deck 45 of a canopy 40 that is concave in form. The deck 45 can have a center portion 51, which can be flat, and peripheral portions 55, which can have varying sloping properties, such as multiple angles of decline. According to one or more embodiments, the peripheral portions 55 can be angled down in step-formed shape to form the overall concave shape of the deck 45. Optionally, one or more longitudinal raised support structures 53 can be provided.

In that the concave shape can be defined by the peripheral portions with varying slope properties, the deck 45 may be able to retain its shape without providing transverse support structures directly in the deck 45 and/or along an upper surface 46 and/or a lower surface 47 of the deck 45. Hence, the deck 45 may be characterized as a self-supporting deck 45. Likewise, in this regard, the canopy 40 may be characterized as a self-supporting canopy 40. Omitting such additional transverse support structures can reduce the weight of the canopy 40. In additional to structural stiffness, the configuration of the deck 45 can reduce vibration of the canopy 40.

The center portion 51, which can be flat, can be configured, size, shape, and/or thickness, to accommodate a certain amount of material added (inadvertently) to the upper surface 46 of the canopy 40. An amount of material added to the center portion 51 greater than the certain amount may be allowed to fall from the upper surface 46 of the canopy 40 in a controlled matter, for instance, over the first and second side edges 43, 44.

As noted above, embodiments of the disclosed subject matter can include one or more raised support structures 53. Such raised support structures 53 can provide structural support for the canopy 40 and may also help retain and/or direct material inadvertently placed on the upper surface 46 of the canopy 40. For instance, in the case of two raised support structures 53 with the center portion 51 therebetween, material of a certain amount (e.g., size) can be retained between the raised support structures 53. Additionally, peaks of the raised support structures 53 can visually discourage loading on top of the canopy 40. When the dump body 30 is raised the material can slide from the canopy 40 and into the haul volume of the dump body 30.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An off-highway rear haul truck comprising:
a frame; and
a dump body configured to be operatively coupled to the frame, the dump body including:
a front wall, and
a self-supporting corrugated canopy having a front edge, a rear edge opposite the front edge, a first side edge, and a second side edge opposite the first side edge, the self supporting corrugated canopy extending from a top portion of the front wall,
wherein the self-supporting corrugated canopy has a down-facing concave shape in a front sectional view, with a plurality of upward-projecting peaks consisting of a first peak and a second peak spaced from each other in a transverse direction by a single valley, a first plurality of steps between the first peak and the first side edge, and a second plurality of steps between the second peak and the second side edge,
wherein the peaks are symmetrical and run parallel to each other from a front portion of the front edge of the self-supporting corrugated canopy to a rear portion of the self-supporting corrugated canopy, and
wherein the single valley has a first width in the transverse direction greater than a second width of each of the peaks.

2. The off-highway rear haul truck according to claim 1, wherein the single valley is entirely flat between bases of the first and second peaks.

3. The off-highway rear haul truck according to claim 1, further comprising a support structure connecting the rear edge of the self-supporting corrugated canopy to the front wall.

4. The off-highway rear haul truck according to claim 1, further comprising:
a first support structure extending from the front wall at a first side edge of the front wall; and
a second support structure extending from the front wall at a second side edge of the front wall opposite the first side edge,
wherein the first support structure is welded to the first side edge of the self-supporting corrugated canopy, and
wherein the second support structure is welded to the second side edge of the self-supporting corrugated canopy.

5. The off-highway rear haul truck according to claim 1, wherein the front edge of the self-supporting corrugated canopy has an upstanding headboard.

6. The off-highway rear haul truck according to claim 1, wherein a transverse distance of the single valley between the first and second peaks is less than a transverse distance from each of the first and second peaks to a closest one of the first side edge or the second side edge in a plan view of the self-supporting corrugated canopy.

7. The off-highway rear haul truck according to claim 1, wherein each of the first and second peaks defines a void on an underside of the self-supporting corrugated canopy.

8. A canopy system for a dump body comprising:
a deck having a length and a width greater in dimension than the length, the deck being defined by a front edge, a rear edge opposite the front edge, a first side edge, and a second side edge opposite the first side edge,
wherein the deck defines an upper surface and a lower surface opposite the upper surface,
wherein in a front plan view the deck defines a down-facing concave shape, with a flat valley portion and stepped portions between the flat valley portion and the first and second side edges,
wherein the flat valley portion is at a center of the deck in the front plan view,
wherein the deck is without any transversely extending support structures on the upper surface and/or on the lower surface, and
wherein the stepped portions at no time increase in height from their respective beginnings to the first and second side edges.

9. The canopy system according to claim 8, wherein the upper surface forms a pair of ridges, each ridge extending in a length-wise direction, and the flat valley portion being between the ridges in a transverse direction.

10. The canopy system according to claim 8, wherein respective angles of decline for the stepped portions increase toward the first edge or the second edge.

11. The canopy system according to claim 8, wherein the front edge of the deck has an upstanding headboard extending therefrom.

12. The canopy system according to claim 8, wherein the deck is without any transversely extending support structures on the lower surface.

13. The canopy system according to claim 8, further comprising:
a first support structure having an arm fixed to the first side edge of the deck and a leg that extends downward from the arm of the first support structure; and
a second support structure having an arm fixed to the second side edge of the deck and a leg that extends downward from the arm of the second support structure.

14. The canopy system according to claim 8, further comprising a transverse support structure provided at the rear edge of the deck and adapted to interface with a front wall of the dump body.

15. A canopy of a dump body for a truck comprising:
a deck having a length and a width greater in dimension than the length, the deck being defined by a front edge, a rear edge opposite the front edge, a first side edge, and a second side edge opposite the first side edge,
wherein the deck defines an upper surface and a lower surface opposite the upper surface,
wherein in a front sectional view the deck defines a down-facing concave shape, with a center recessed portion and stepped portions between the center recessed portion and the first and second side edges,
wherein the center recessed portion is at a center of the deck in a front plan view,
wherein the stepped portions, collectively, at no time increase in height from a beginning thereof to respective ones of the first and second side edges, and
wherein the center recessed portion is free of any ridges.

16. The canopy structure according to claim 15, wherein the upper surface forms at least one ridge between the center recessed portion and at least one of the first side edge and the second side edge in a transverse direction, each said at least one ridge extending in a length-wise direction of the deck.

17. The canopy structure according to claim 16, wherein the lower surface forms at least one void in respective correspondence with the at least one ridge.

18. The canopy structure according to claim 16,
wherein each said at least one ridge extends from at or about at the front edge of the deck to at or about at the rear edge of the deck,
wherein the upper surface forms two of said ridges, and
wherein the upper surface defines a flat area as part of the center recessed portion between the two ridges.

19. The canopy structure according to claim 15, wherein the deck is without any transversely extending support structures on the upper surface and/or on the lower surface.

20. The canopy structure according to claim 15, wherein respective angles of decline for the stepped portions increase toward the first edge or the second edge.

\* \* \* \* \*